6003X
No printed specification available
I. Brewster,
Churn.
Patented May 28. 1830.
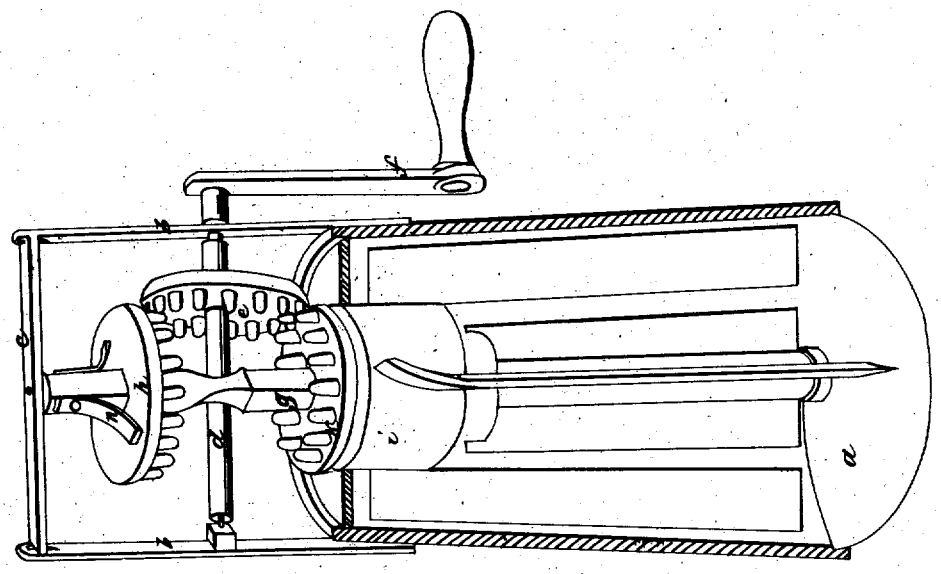
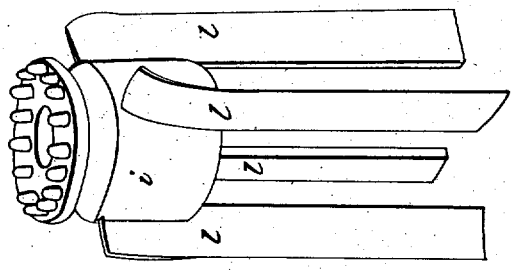
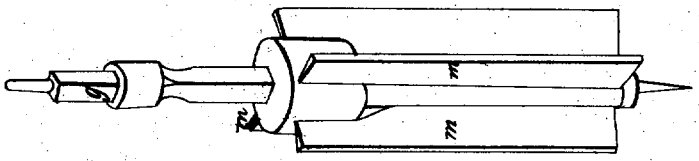

X6003 Isaac Brewster Schoharie N.Y. May 28. 1830 127

Letters Patent

The Schedule referred to in these Letters Patent and making part of the same containing a description in the words of the said Isaac Brewster him self of his improvement in the Churn. ... ... ...

To all persons to whom these presents shall come Isaac Brewster of the town of Blenheim in the County of Schoharie & State of New York sends Greeting - ......

Be it known that I the said Isaac Brewster have invented a new and useful improvement not known or used before in the making manufacturing or extracting of Butter from Milk or Cream which [illegible] and the manner of using it is as follows. ... ... ...

This improvement in the Churn and the manufacturing making or extracting of Butter from Milk or Cream consists in the machinery within and attached to the barrel of the Churn to wit; ... ...

two moveable standards attached to the outside of the Churn near the top: — on the top of these a piece is framed across and connects them together: to the inside of one of these standards is attached a small block, which together with the standard supports the horizontal shaft on which hangs the face cog wheel which is turned with a crank: an upright shaft fixed in the centre of the bottom of the Churn and turns in a box. The top end of this shaft runs through the piece framed across the standards or upright posts directly under this cross piece and on the shaft is attached a spur wheel, which matches into the face of the cog wheel — at the under side of the face wheel another spur wheel matches into the same wheel: this last ~~spur wheel~~ is attached to the top of a circular block ~~through~~ this block and spur wheel a circular hole is cut large enough to admit the shaft on the shaft a shoulder is cut to support the block to this block are attached wings or fliers [illegible] near the top and of a [illegible] [illegible] form below the [illegible] extending down near the sides of the Churn to near the bottom [illegible] of wings are attached to the middle shaft & [illegible] within

128. X6003 the outside set, in an opposite direction the upper shoe which is moved
by means of springs to keep the main shoe if necessary in the gathering
of the leather. In witness whereof I have hereunto subscribed my name this
16 day of March 1836

Witness
[illegible]
James [illegible]

[illegible] Brewster.

476 rds

Ex.
[illegible]